(12) United States Patent
Chen (10) Patent No.: US 11,409,787 B2
(45) Date of Patent: Aug. 9, 2022

(54) METHOD FOR EXECUTING DOCKER IMAGE UNDER PROTECTION

(71) Applicant: NEXCOM International Co., Ltd., New Taipei (TW)

(72) Inventor: Yi-Chung Chen, New Taipei (TW)

(73) Assignee: NEXCOM INTERNATIONAL CO., LTD., New Taipei (TW)

( * ) Notice: Subject to any disclaimer, the term of this patent is extended or adjusted under 35 U.S.C. 154(b) by 156 days.

(21) Appl. No.: 17/094,071

(22) Filed: Nov. 10, 2020

(65) Prior Publication Data

US 2022/0147560 A1    May 12, 2022

(51) Int. Cl.
| | | |
|---|---|---|
| G06F 16/535 | (2019.01) | |
| G06F 16/51 | (2019.01) | |
| G06F 8/61 | (2018.01) | |
| G06F 9/455 | (2018.01) | |

(52) U.S. Cl.
CPC .......... G06F 16/535 (2019.01); G06F 8/63 (2013.01); G06F 9/45558 (2013.01); G06F 16/51 (2019.01); G06F 2009/45562 (2013.01)

(58) Field of Classification Search
CPC ............. G06F 8/63; G06F 9/45558; G06F 2009/45562; G06F 16/51; G06F 16/535
See application file for complete search history.

(56) References Cited

U.S. PATENT DOCUMENTS

| | | | |
|---|---|---|---|
| 9,639,558 B2 * | 5/2017 | Alton | G06F 8/60 |
| 10,002,247 B2 * | 6/2018 | Suarez | G06F 9/45558 |
| 10,031,735 B2 * | 7/2018 | Baset | G06F 8/60 |
| 11,134,093 B1 * | 9/2021 | Bog | G06F 16/9537 |
| 2016/0275287 A1 * | 9/2016 | Wiest | G06F 21/562 |
| 2018/0213029 A1 * | 7/2018 | Khalaf | H04L 12/4641 |

(Continued)

FOREIGN PATENT DOCUMENTS

| | | | | |
|---|---|---|---|---|
| CN | 110704156 A | * | 1/2020 | G06F 8/63 |
| CN | 112860335 A | * | 5/2021 | |

OTHER PUBLICATIONS

Mavridis et al., "Combining containers and virtual machines to enhance isolation and extend functionality on cloud computing", 2018 , Elsevier B.V. (Year: 2018).*

(Continued)

*Primary Examiner* — Wei Y Zhen
*Assistant Examiner* — Junchun Wu
(74) *Attorney, Agent, or Firm* — Chun-Ming Shih; HDLS IPR Services (57) ABSTRACT

A method for executing Docker images under protection used for an improved Docker server and a Docker image having an extended field is disclosed. The method includes: receiving a Docker container creating instruction by the Docker server and obtaining a Docker image corresponding to the instruction; reading a protection column in the extended field of the Docker image; determining whether the Docker image is a protected image according to content of the protection column; obtaining an actual environmental requirement if the Docker image is the protected image, and replacing content of an environment column in an original field of the Docker image with the actual environmental requirement; and executing the Docker image based on the original field with the content-replaced environment column.

10 Claims, 6 Drawing Sheets

(56) References Cited

U.S. PATENT DOCUMENTS

| | | | | |
|---|---|---|---|---|
| 2019/0028490 | A1* | 1/2019 | Chen | G06F 9/45558 |
| 2019/0102214 | A1* | 4/2019 | Kondo | G06F 9/48 |
| 2019/0114164 | A1* | 4/2019 | Wong | G06F 8/658 |
| 2020/0241867 | A1* | 7/2020 | Gainsborough | G06F 8/63 |
| 2021/0075855 | A1* | 3/2021 | Spillane | H04L 67/1095 |
| 2022/0012045 | A1* | 1/2022 | Rudraraju | G06Q 30/02 |
| 2022/0043916 | A1* | 2/2022 | Wolfson | G06F 21/602 |

OTHER PUBLICATIONS

Xu et al., "Decentralized Content Trust for Docker Images", 2017, SCITEPRESS (Year: 2017).*

Ma et al., "Efficient Service Handoff Across Edge Servers via Docker Container Migration", 2017, ACM (Year: 2017).*

Tarasov et al., "Evaluating Docker storage performance: from workloads to graph drivers", 2018, Springer (Year: 2018).*

Giannakopoulos et al., "Isolation in Docker through Layer Encryption", 2017, IEEE (Year: 2017).*

Kurtzer et al., "Singularity: Scientific containers for mobility of compute", May 2017, PLOS One (Year: 2017).*

\* cited by examiner

METHOD FOR EXECUTING DOCKER IMAGE UNDER PROTECTION

BACKGROUND OF THE INVENTION

1. Technical Field

The technical field relates to a method for executing a Docker image, and specifically relates to a method for executing a Docker image and protecting the Docker image from being duplicated freely.

2. Description of Related Art

Docker is an open-source software (OSS) published by Docker, INC. Docker is used for establishing Docker images, wherein each of the Docker images respectively contains the resources and related data necessary for a host to correctly run a target program.

Generally speaking, the programmer can establish a Docker image according to client's need, and then deploys the established Docker image to client's host. Upon running the Docker image by a Docker daemon, which is a software implemented server, the client's host can create a Docker container corresponding to content of the Docker image. Therefore, the client's need can be accomplished by the Docker container.

Docker is an application software similar to virtual machine (VM). The difference between Docker and VM is that multiple Docker containers created by Docker can be separated to not interfere each other and share the service in the same fundamental operating system (OS). The Docker containers only require few resources from the host, and can be easily deployed and quickly booted, so the Docker containers are popular to the programmers.

As discussed above, one purpose of using Docker is convenient deployment. However, after the programmer provides a Docker image to the client, the client may duplicate and run this Docker image on multiple hosts easily and freely. As a result, the right of the programmer is not under protection.

Besides, a few hardware manufacturers pre-deploy self-developed Docker image(s) in their machines while manufacturing to satisfy client's need. However, the client may retrieve the Docker image(s) from the machines after purchasing, and unlimitedly deploy the retrieved Docker image (s) to another machine purchased from a third-party. The hardware manufacturers may be influenced.

SUMMARY OF THE INVENTION

The disclosure is directed to a method for executing a Docker image under protection, which may prevent the Docker image from being unlimitedly deployed to an unauthorized host.

In one of the exemplary embodiments, the method is incorporated with a Docker server being improved and a Docker image having an extended field. The method includes the following steps: receiving a container creating instruction by the Docker server and obtaining the Docker image corresponding to the container creating instruction; reading a protection column within the extended field of the Docker image; determining whether the Docker image is a protected image according to content of the protection column; obtaining an actual environmental requirement of the Docker image if the Docker image is the protected image, and replacing content of an environment column in the original field of the Docker image with the actual environmental requirement; and executing the Docker image based on content of the original field.

During an establishment of a Docker image, the data structure of the Docker image is modified by adding an extended field in this invention. A wrong environmental requirement is written to the original field of the Docker image on purpose. The wrong environmental requirement recorded in the original field may be replaced, before the Docker image is executed, by an actual environmental requirement of the Docker image obtained by an improved Docker server. By doing so, the Docker image being unlimitedly deployed to an unauthorized host may be prevented.

Also, the method of this invention is incorporated with an improved Docker server, the Docker server only reads the extended field of the Docker image when the Docker image is determined as an extended image, and the Docker server executes the Docker image through a normal procedure when the Docker image is determined as a normal image. Therefore, the Docker server of this invention can execute the pre-determined extended images as well as the normal images. The protectiveness and practicality are both achieved.

DETAILED DESCRIPTION OF THE INVENTION

In cooperation with the attached drawings, the technical contents and detailed description of this invention are described thereinafter according to multiple embodiments, being not used to limit its executing scope. Any equivalent variation and modification made according to appended claims is all covered by the claims claimed by this invention.

This invention discloses a method for executing a Docker image under protection (referred to as an executing method hereinafter), and the executing method is incorporated with an improved Docker daemon (referred to as a Docker server hereinafter). The Docker server may correctly execute a Docker image which is under protection (referred to as an extended image hereinafter), and may create a Docker container (referred to as a container hereinafter) correspondingly according to the execution of the Docker image.

Specifically, the extended image is an image with a data structure being modified in a specific manner. In addition to multiple original fields included in a normal image (i.e., a standard image that the data structure is not modified), the extended image of this invention further includes one or more extended fields. One of the technical features of this invention is that, during establishing the extended image, a programmer may write a part of correct data to the extended field(s), and write wrong data to the original field(s) intentionally.

A Docker server deployed on an unauthorized host may be a standard Docker server without specific setting and modification. If the extended image is deployed to the unauthorized host, the standard Docker server thereon is not informed about the wrong data recorded in the original fields of the extended image, so the standard Docker server cannot interpret the extended image correctly. As a result, a container corresponding to the extended image cannot be created by the standard Docker server. The protection to the extended image is achieved.

Figure 1:
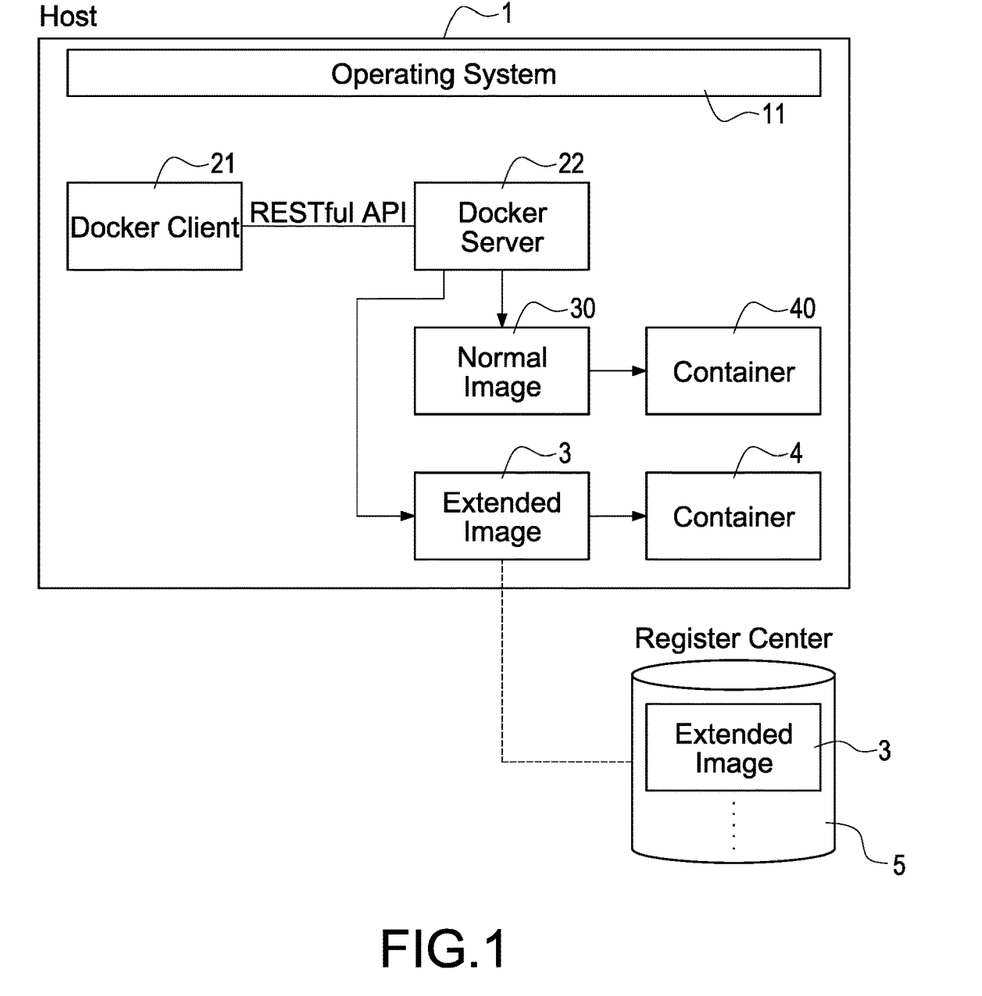
FIG. 1 is a schematic diagram of a Docker system of a first embodiment according to this invention.

Please refer to FIG. 1, which is a schematic diagram of a Docker system of a first embodiment according to this invention. As disclosed in FIG. 1, a host 1 may be installed with a Docker system based on the resources provided by the operating system (OS) 11. The Docker system includes a Docker client 21, a Docker server 22, and a representational state transfer application programming interface (RESTful API) between the Docker client 21 and the Docker server 22 for establishing communication. In one of the exemplary embodiments, the host 1 may be a personal computer (PC), a laptop, a server, a tablet, etc., and the operating system 11 may be Windows, Linux, macOS, etc., but not limited thereto.

It is worth saying that the Docker system is an open-source software platform. In other words, the Docker client 21 and the Docker server 22 in this invention indicate software-implemented client-end and software-implemented server-end installed in the host 11 respectively instead of individually existed hardware.

In this invention, the Docker server 22 indicates an improved Docker server. The Docker server 22 may execute a normal image 30 for creating a container 40 according to content of the normal image 30. The Docker server 22 may also execute the extended image 3 of this invention for creating a container 4 according to content of the extended image 3.

In one embodiment, the extended image 3 is deployed to the host 1 by the user. In another embodiment, the programmer may upload and store the extended image 3 to a Docker register center 5 (referred to as a register center 5 hereinafter) after the extended image 3 is established. The user may control the host 1 to connect to the register center 5 through the Internet, and then download and deploy the extended image 3 to the host 1. Also, the user may obtain the authorization of the extended image 3 for the host 1 after registration. It should be noted that the location of uploading the extended image 3 and the location of registration may be different. More specific, the programmer may upload a newly established extended image 3 to a public Docker Hub, and the user may register the downloaded extended image 3 to a machine administered by the programmer. The detailed description of the above-mentioned uploading, registering, and Docker Hub is omitted here for brevity.

Is should be noted that, if the Docker server installed in the host 1 is not the Docker server 22 of this invention, the host 1 is incapable of executing the extended image 3 correctly with its Docker server (detail is described below).

Figure 2:
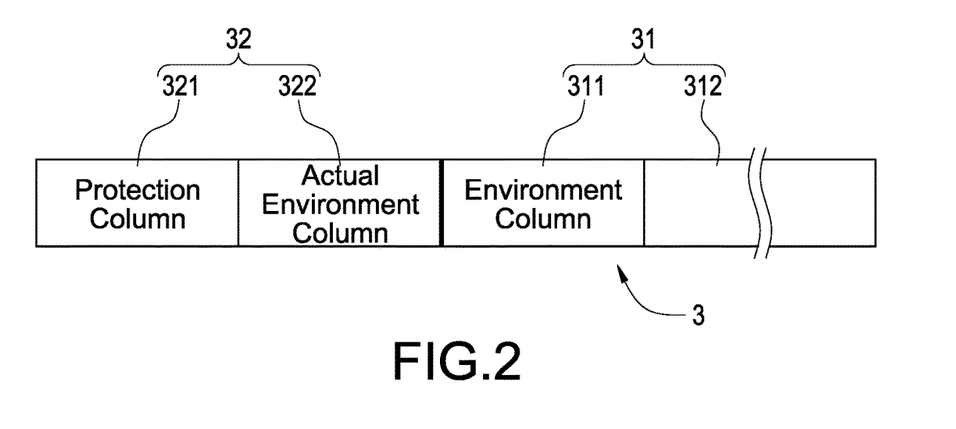
FIG. 2 is a schematic diagram showing data structure of an image of a first embodiment according to this invention.

FIG. 2 is a schematic diagram showing data structure of an image of a first embodiment according to this invention. In addition to multiple original fields 31 included in normal images (i.e., the standard images that the data structure is not extended), the data structure of the extended image 3 is modified by adding one or more extended fields 32. As shown in FIG. 2, the original fields 31 at least include an environment column 311 and a data column 312, and the extended fields 32 may include a protection column 321 and an actual environment column 322.

In one of the exemplary embodiments, the protection column 321 records content of indicating whether the extended image 3 is a protected image or not. In other words, content of the protection column 321 is used to indicate if the extended image 3 is solely executed by the improved Docker server 22.

The actual environment column 322 and the environment column 311 record content of indicating a supportive operating system(s) of the extended image 3. In other words, contents of the actual environment column 322 and the environment column 311 are used to indicate which operating system(s) may be used by the host 1 for correctly and successfully executing the extended image 3.

In one embodiment, if the extended image 3 is not the protected image, the environment column 311 of the extended image 3 is used to record the supportive operating system of the extended image 3, and content of the actual environment column 322 may be blank (or null). In another embodiment, if the extended image 3 is the protected image, the actual environment column 322 of the extended image 3 is used to record the supportive operating system of the extended image 3, and a wrong information is recorded in the environment column 311 of the extended image 3.

In still another embodiment, the extended fields 32 of the extended image 3 may not include the above-mentioned actual environment column 322. If the extended image 3 is not the protected image in this embodiment, the environment column 311 may be used to directly record the operating system supported by the extended image 3. If the extended image 3 is the protected image in this embodiment, the environment column 311 is used to record wrong environmental requirement (i.e., wrong or unsupportive operating system(s) which is unsupported by the extended image 3, such as HyperX, HyperM, etc.). When the extended image 3 is executed, a pre-defined lookup table (not shown) may be inquired according to content of the environment column 311, and the operating system(s) actually supported by the extended image 3 may be obtained from the lookup table according to the wrong environmental requirement recorded in the environment column 311. The above descriptions are only the exemplary embodiments of this invention, not limited thereto.

Through the above-mentioned solution, the protected extended image 3 being executed by a Docker server without an authorization of the provider may be prevented. More specific, the Docker server without the authorization may not recognize that the environment column 311 of the extended image 3 records wrong information, and may not recognize the existence of the actual environment column 322 and/or the lookup table.

In one of the exemplary embodiments, the data column 312 is used to record specific data of the extended image 3. The Docker server 22 executes the extended image 3 for creating a corresponding container 4 according to the data recorded in the data column 312. The detailed description of how a Docker server creates a container 4 according to content of the data column 312 is omitted here for brevity.

Figure 3:
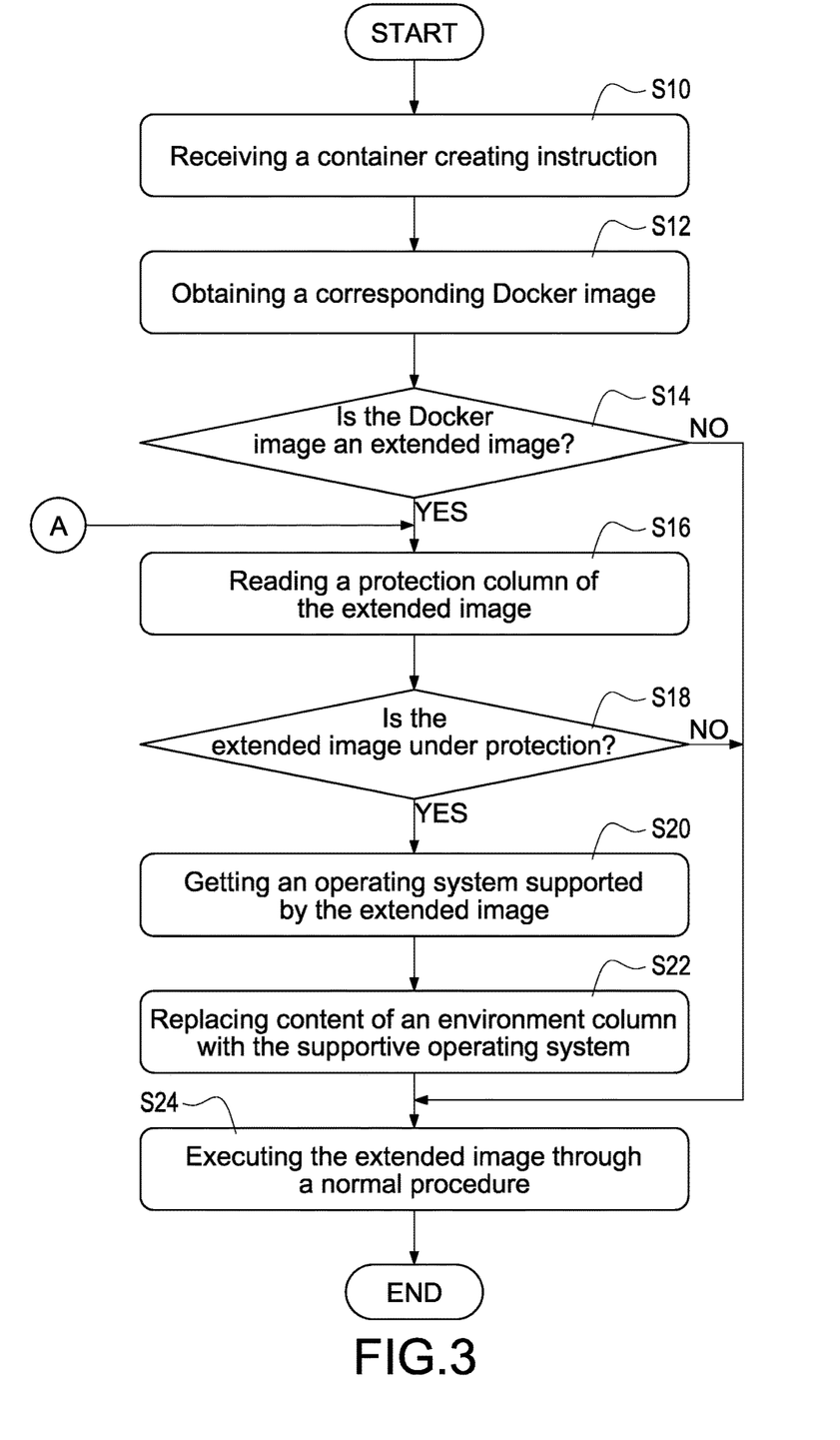
FIG. 3 is a flowchart of executing an image of a first embodiment according to this invention.

Please refer to FIG. 3, which is a flowchart of executing an image of a first embodiment according to this invention. When the Docker server 22 is instructed to create a container 4, the Docker server 22 receives a container creating instruction (step S10), and obtains a Docker image corresponding to the container creating instruction (step S12). In one of the exemplary embodiments, the Docker server 22 may receive the container creating instruction from the Docker client 21 through the RESTful API, and the container creating instruction may be, for example but not limited to, a command of "docker run". Any command or instruction which can trigger the Docker server 22 to search for and to execute the Docker image for creating the container 4 should be considered falling into the scope of this invention, the above description is only provided as an example and but limited thereto.

After the step S12, the Docker server 22 determines whether the obtained Docker image is the extended image 3 having the modified data structure or not (step S14). In one of the exemplary embodiments, the Docker server 22, in the step S12, determines whether the Docker image is the extended image 3 by checking if the Docker image includes the extended fields 32 and/or if content of the extended fields 32 indicates that the Docker image is under protection. If the obtained Docker image is determined as the normal image 30 having the standard data structure instead of the extended image 3 having the extended fields 32, the Docker server 22 executes the normal image 30 for creating a corresponding container 40 through a normal procedure (step S24).

In one of the exemplary embodiments, the above-mentioned normal procedure may include the following steps:

Step one: reading the environment column 311 in the original fields 31 of the Docker image, so as to obtain the operating system supported by the Docker image;

Step two: determining whether the operating system 11 of the host 1 running the Docker server 22 matches content of the environment column 311 of the Docker image;

Step three: forbidding the Docker image to be executed by the host 1 if the operating system 11 of the host 1 does not match content of the environment column 311 of the Docker image (for example, if content of the environment column 311 records "Linux", the host 1 is determined to be not matching the Docker image when the operating system 11 of the host 1 is "Windows"); and Step four: allowing the Docker image to be executed for creating a corresponding container 40 according to the data recorded in the data column 312 of the original fields 31 of the Docker image if the operating system 11 of the host 1 matches content of the environment column 311 of the Docker image.

Generally, the normal image 30 does not include the extended fields 32, and the supportive operating system of the normal image 30 is recorded in the environment column 311 of the normal image 30. Hence, the Docker server 22 may execute the Docker image directly through the normal procedure when the Docker image is determined as the normal image 30.

By using the executing method of this invention, both a Docker server without the authorization and the improved Docker server 22 with the authorization may correctly execute the obtained Docker image according to the original fields 31 of the Docker image when the Docker image is the normal image 30.

If the Docker server 22, in the step S14, determines that the obtained Docker image is the extended image 3 having the modified data structure, the Docker server 22 reads the protection column 321 in the extended fields 32 of the extended image 3 (step S16), and determines whether the extended image 3 is the protected image according to content of the protection column 321 (step S18). If the extended image 3 is not the protected image, the Docker server 22 may directly use the normal procedure to execute the extended image 3 according to the aforementioned steps for creating a corresponding container 4 (step S24).

In one of the exemplary embodiments, the programmer may write an identifiable pre-determined ID (an ID with a specific manner) in the protection column 321. Specifically, if the extended image 3 is a root image, the pre-determined ID may be "RootExtendedImage" or the like. If the extended image 3 is not the root image, the pre-determined ID may be an image ID of the root image related to the extended image 3. It should be noted that the original fields 31 of both of a standard image and the extended image 3 include a column (not shown) for recording the image ID of the standard image/the extended image 3.

In the step S18, the Docker server 22 determines that the extended image 3 is the protected image if the pre-determined ID is recorded in the protection column 321 of the extended image 3. On the other hand, the Docker server 22 determines that the extended image 3 is not the protected image if the protection column 321 of the extended image 3 remains null (i.e., the special ID is not recorded in the protection column 321). The above description is only one of the multiple embodiments of this invention, but not limited thereto.

If the extended image 3 is the protected image, it indicates that the environment column 311 of the extended image 3 is being written with wrong information. For example, the operating system supported by the extended image 3 is Windows, but the programmer wrote "macOS" to the environment column 311 of the extended image 3 while establishing the extended image 3. For another example, the programmer wrote a made-up OS name, such as "HyperX", "HyperM", etc., to the environment column 311 of the extended image 3 while establishing the extended image 3. In this scenario, the Docker server 22 needs to get an operating system actually supported by the extended image 3 (step S20), and uses the operating system (i.e., the operating system actually supported by the extended image 3) to replace content of the environment column 311 of the extended image 3 (step S22). The Docker server 22 may use the normal procedure to execute the extended image 3 with the replaced environment column 311 according to the aforementioned steps (step S24).

In one embodiment, the extended fields 32 of the extended image 3 include an actual environment column 322. The programmer may write the operating system actually supported by the extended image 3 to the actual environment column 322 while establishing the extended image 3. In the step S20, the Docker server 22 may read the actual environment column 322 of the extended image 3 for getting the operating system actually supported by the extended image 3.

In another embodiment, the above-mentioned actual environment column 322 may not be included in the extended fields 32 of the extended image 3. The programmer may create a lookup table (not shown) in the program. The lookup table records a relationship between content of the environment column 311 (i.e., wrong information) and the operating system actually supported by the extended image 3. For example, the lookup table records that "HyperX" corresponds to "macOS", "HyperM" corresponds to "Windows", etc. In the step S20, the Docker server 22 may read the environment column 311, and inquire the lookup table according to content of the environment column 311 (such as "HyperX", "HyperM", etc.), so as to get the operating system actually supported by the extended image 3 from the inquiring result of the lookup table.

As discussed above, the environment column 311 of the extended image 3 may be written with wrong information, so the extended image 3 may be protected from being executed by an unauthorized Docker server. However, the Docker server 22 of this invention may use the correct information (i.e., content of the actual environment column 322 or content from the lookup table) to replace the wrong information (i.e., content of the environment column 311) through the execution of the step S20 and the step S22, so the Docker server 22 may execute the extended image 3 through the normal procedure in the step S24 without causing any error.

By using such technical solution, a Docker image (such as the extended image 3) established by a programmer may be protected from being unlimitedly deployed to another host. Moreover, the Docker server 22 of this invention may correctly execute both of the normal image 30 with the standard data structure and the extended image 3 with the modified data structure.

According to the characteristics of Docker, even if the user applies commands, such as docker build, docker commit, etc., by the Docker client 21 to store the extended image 3 as a new image, the data structure of the extended image 3 is inherited to the new image. Thus, if the extended image 3 is the protected image, the new image established from the extended image 3 may not be correctly read and executed by an unauthorized Docker server as well.

In one embodiment, the programmer may register the extended image 3 to a remote register center 5 after the extended image 3 is established, and the programmer may upload the extended image 3 to the register center 5. Based on the registration, this invention prevents the improved Docker server 22 and the extended image 3 from being deployed by the user to an unauthorized host (such as a host purchased from an unauthorized hardware manufacturer), and prevents the improved Docker server 22 and the extended image 3 from being executed by such unauthorized host (detail is described below).

Figure 4:
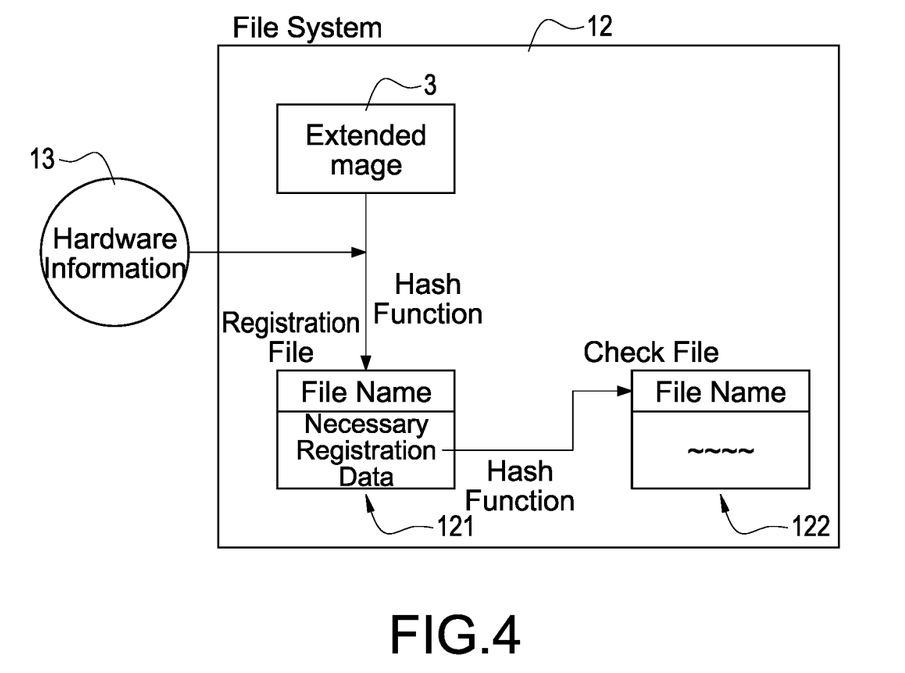
FIG. 4 is a schematic diagram of registration of a first embodiment according to this invention.

FIG. 4 is a schematic diagram of registration of a first embodiment according to this invention. As shown in FIG. 4, when performing a registration for an extended image 3, the Docker server 22 obtains the image ID of the extended image 3, and obtains an identifiable hardware information 13. In particular, the hardware information 13 indicates the identification number with respect to the internal hardware of the authorized host (for example, the host 1 running the Docker server 22, or the other hosts being authorized to execute the extended image 3), such as ID of a central processing unit (CPU), serial number of a hard-drive, or a media access control address (MAC Address) of a network card, etc., but not limited thereto.

In the embodiment, the Docker server 22 concatenates the image ID and the hardware information 13 for ensuring the uniqueness of the information, and the Docker server 22 sends the concatenated information to the register center 5 with necessary registration data for registering the extended image 3 to the register center 5.

After receiving a message of successful registration from the register center 5, a registration file 121 may be created by the Docker server 22 to the file system 12 of the host 1, and the necessary registration data is stored in the registration file 121. In the embodiment, the Docker server 22 computes the concatenated information of the image ID and the hardware information 13 through hash function to obtain a first hash value, and the Docker server 22 uses the first hash value as the file name of the registration file 121 (for example, the file name of the registration file 121 is identical to the first hash value).

In order to prevent the registration file 121 from being modified by the user, in another embodiment, a check file 122 may be created by the Docker server 22 to the file system 12. More specific, the Docker server 22 computes content of the registration file 121 (i.e., the necessary registration data) through a hash function to obtain a second hash value, and the Docker server 22 uses the second hash value as the file name of the check file 122 (for example, the file name of the check file 122 is identical to the second hash value).

The registration file 121 is used to confirm whether an extended image 3 is registered or not, and to confirm whether the extended image 3 is allowed to be executed on the current host 1. The check file 122 is used to confirm, when the registration file 121 exists (it represents that the extended image 3 is registered), whether the necessary registration data of the extended image 3 is being modified (detail is described below).

Figure 5:
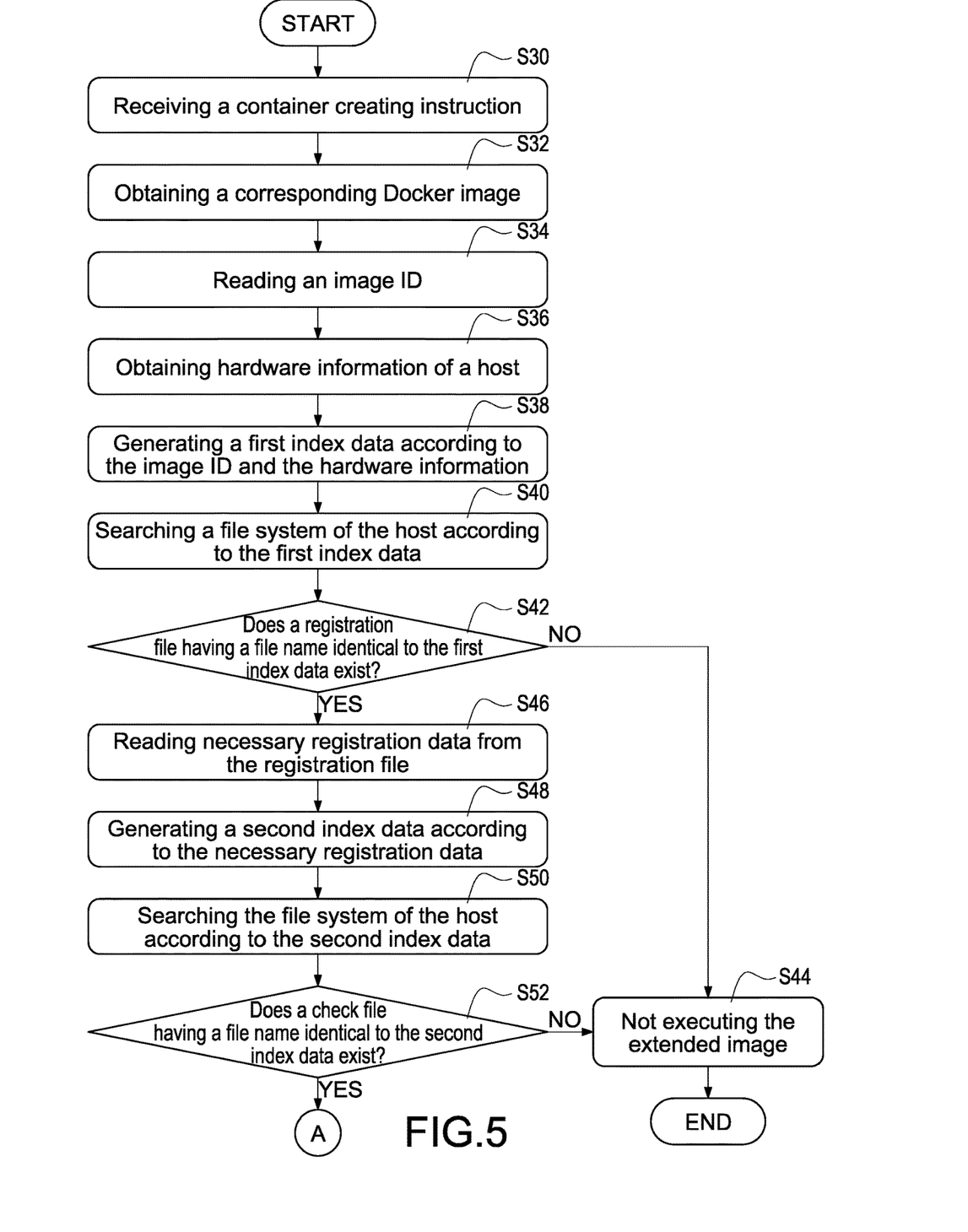
FIG. 5 is a flowchart of executing an image of a second embodiment according to this invention.

Please also refer to FIG. 5, which is a flowchart of executing an image of a second embodiment according to this invention. Similar to the disclosure of FIG. 3, the Docker server 22 in this embodiment receives a container creating instruction before executing a Docker image (step S30), and obtains the Docker image corresponding to the container creating instruction (step S32). The Docker server 22 confirms that the obtained Docker image is the extended image 3, and reads the image ID from the protection column 321 of the extended image 3 (step S34). Also, the Docker server 22 obtains the hardware information 13 of the host 1 running the Docker server 22 (step S36). As the above disclosure, the hardware information 13 may be, for example but not limited to, CPU ID, serial number of hard-drive, MAC Address of network card, etc. of the host 1.

After the step S36, the Docker server 22 generates a first index data according to the obtained image ID and hardware information 13 (step S38). The Docker server 22 searches the file system 12 of the host 1 according to the first index data (step S40). The Docker server 22 determines whether a registration file 121 having a file name identical to the first index data exists in the file system 12 (step S42).

In the step S38, similar to the procedure of registration, the Docker server 22 concatenates the image ID and the hardware information 13 for generating a concatenated data, and computes the concatenated data through a hash function for generating the first index data. In other words, if the image ID of the extended image 3 is the same as the image ID of the extended image 3 used for registration, and the hardware information 13 of the host 1 is the same as the hardware information 13 used for registration, as a result, the first index data generated by the hash function is also the same as the file name of the registration file 121 generated through the same hash function.

If the Docker server 22 cannot find the registration file 121 having the file name identical to the first index data in the step S42, it means that the extended image 3 is unregistered, or the using host 1 is different from the host used for registration. Under such circumstance, the Docker server 22 is not allowed to execute the extended image 3 (step S44).

By using the technical solution discussed above, both of the extended image 3 and the improved Docker server 22 can be protected. More specific, if the user deploys the extended image 3 and the improved Docker server 22 to another unauthorized host, the hardware information of the unauthorized host is different from the hardware information 13 of the host 1 used for registration. Hence, the unauthorized host cannot correctly execute the extended image 3 even the improved Docker server 22 is deployed on this unauthorized host.

If the Docker server 22 obtains the registration file 121 having the file name identical to the first index data in the step S42, it means that the extended image 3 is registered, and the using host 1 is identical to the host used for registration. Under such circumstance, the Docker server 22 may execute the extended image 3 according to the step S20, the step S22, and the step S24 as disclosed in FIG. 3. In detail, the Docker server 22 reads content of the actual environment column 322 of the extended image 3 or content from the lookup table, and replaces content of the environment column 311 with content of the actual environment column 322 or replaces content of the environment column 311 with content from the lookup table, and executes the extended image 3 through the normal procedure according to content of the original fields 31 of the extended image 3.

In another embodiment, the Docker server 22 created the check file 122 after the registration of the extended image 3. In this embodiment, the Docker server 22 further reads the necessary registration data from the registration file 121 after the registration file 12 having the file name identical to the first index data is obtained (step S46).

After the step S46, the Docker server 22 may generate a second index data according to the necessary registration data (step S48). For example, the Docker server 22 may compute the necessary registration data through a hash function to generate the second index data. Also, the Docker server 22 searches the file system 12 of the host 1 according to the second index data (step S50), and determines whether the check file 122 having the file name identical to the second index data exists in the file system 12 (step S52).

As mentioned above, the file name of the check file 122 is generated according to the necessary registration data. If the Docker server 22 cannot obtain the check file 122 having the file name identical to the second index data in the step S52, it means that the necessary registration data recorded in the registration file 121 is being modified. Under such circumstance, the Docker server 22 is not allowed to execute the extended image 3 (step S44). As a result, the extended image 3 may be further protected.

If the Docker server 22 obtains the check file 122 having the file name identical to the second index data in the step S52, the Docker server 22 may execute the extended image 3 according to the step S20, the step S22, and the step S24 as disclosed in FIG. 3. In detail, the Docker server 22 reads content of the actual environment column 322 of the extended image 3 or content from the lookup table, and replaces content of the environment column 311 with content of the actual environment column 322 or replaces content of the environment column 311 with content from the lookup table, and executes the extended image 3 through the normal procedure according to content of the original fields 31 of the extended image 3.

According to the characteristics of Docker, even the user applies commands like docker build, docker commit, etc., through the Docker client 21 to create a new image (referred to as a child image) based on the extended image 3, the pre-determined ID recorded in the protection column 321 of the extended image 3 is inherited to the child image. Further, if the user operates the Docker client 21 to create another new image (referred to as a grandchild image) based on the child image, the pre-determined ID of the extended image 3 is still inherited to the grandchild image. In other words, no matter how many descendant images are created based on the extended image 3, the extended image 3 is regarded as a root image to all of the descendant images, and the pre-determined ID of the extended image 3 is inherited to the data structure of every newly created image. Thus, the extended image 3 being inappropriately duplicated may be prevented through aforementioned features. Further, a new image does not need to record all the ancestral image ID and may be traced to the root image by the inherited pre-determined ID.

In the above-mentioned embodiment, the Docker server 22 is not allowed to execute the extended image 3 if the registration file 121 cannot be obtained in the file system 15 of the host 1. However, considering the convenience for deploying the Docker image, the programmer may modify the data structure of the extended image 3 under certain circumstances, so the Docker server 2 may still be allowed to execute the extended image 3 even the registration file 121 is inexistent in the file system 15 of the host 1 (detail is described below).

Figure 6:
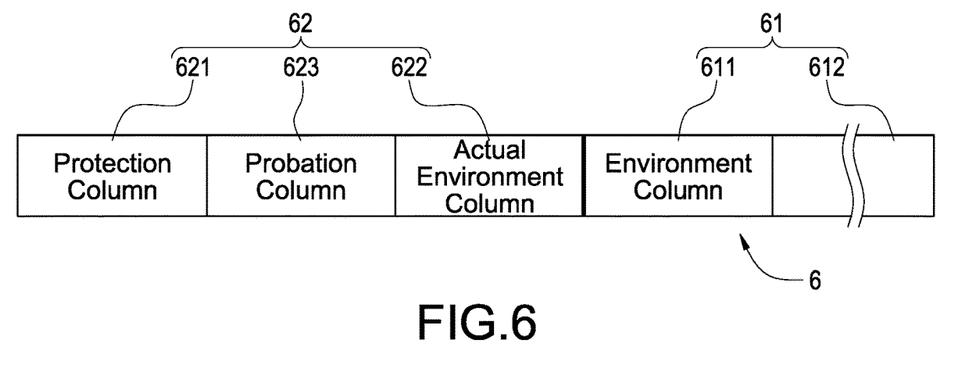
FIG. 6 is a schematic diagram showing data structure of an image of a second embodiment according to this invention.
Figure 7:
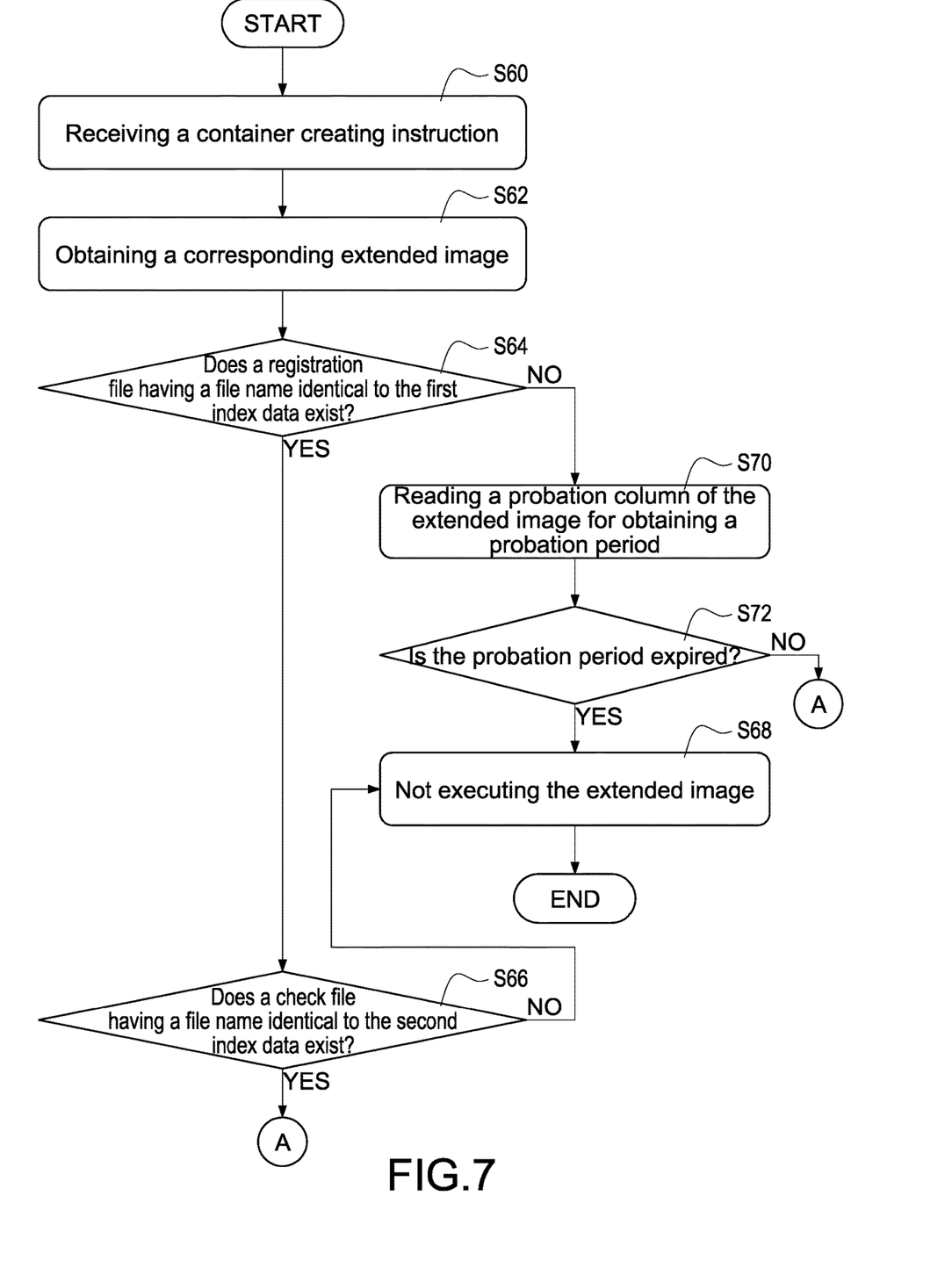
FIG. 7 is a flowchart of executing an image of a third embodiment according to this invention.

Please refer to FIG. 6 and FIG. 7, FIG. 6 is a schematic diagram showing data structure of an image of a second embodiment according to this invention, and FIG. 7 is a flowchart of executing an image of a third embodiment according to this invention. The embodiment of FIG. 6 discloses another extended image 6. The data structure of the extended image 6 shown in FIG. 6 is similar to the data structure of the extended image 3 shown in FIG. 2, which includes original fields 61 and extended fields 62. The original fields 61 include an environment column 611 and a data column 612 similar to the environment column 311 and the data column 312 of the extended image 3 shown in FIG. 2, the detailed description is omitted here.

The extended field 62 includes a protection column 621, an actual environment column 622, and a probation column 623. The protection column 621 and the actual environment column 622 are similar to the protection column 321 and the actual environment column 322 of the extended image 3 shown in FIG. 2, the detailed description is omitted here.

The difference between the extended image 6 and the above-discussed extended image 3 is that the extended fields 62 of the extended image 6 further includes the probation column 623. The probation column 623 is used for recording a probation period of the extended image 6.

Like the disclosure of FIG. 3, the Docker server 22 in this embodiment receives a container creating instruction before executing the extended image 6 (step S60), and the Docker server 22 obtains the extended image 6 corresponding to the container creating instruction (step S62).

After confirming that the extended image 6 is the protected image, the Docker server 22 applies the technical solution as disclosed in FIG. 5 to generate a first index data according to the image ID of the extended image 6 and the hardware information 13 of the host 1 running the Docker server 22. The Docker server 22 searches the file system 12 of the host 1 according to the first index data, and determines whether the registration file 121 having the file name identical to the first index data exists in the file system 12 (step S64).

Like the technical solution disclosed in FIG. 5, if the registration file 121 having the file name identical to the first index data is obtained in the step S64, the Docker server 22 generates a second index data according to content of the registration file 121, and searches the file system 12 of the host 1 according to the second index data and determines whether the check file 122 having the file name identical to the second index data exists in the file system 12 (step S66). If the check file 122 having the file name identical to the second index data is inexistent in the file system 12, the Docker server 22 is not allowed to execute the extended image 6 (step S68).

If the check file 122 having the file name identical to the second index data is obtained in the step S66, the Docker server 22 may execute the extended image 6 according to the step S20, the step S22, and the step S24 as disclosed in FIG. 3.

In the step S64 of this embodiment, when the Docker server 22 determines that the registration file 121 is inexistent in the file system 12, the Docker server 22 proceeds to read the probation column 623 of the extended image 6 for obtaining the probation period recorded in the probation column 623 (step S70). The Docker server 22 determines whether the probation period of the extended image 6 is expired (step S72). In one of the exemplary embodiments, the probation period of the extended image 6 is determined to be expired by the Docker server 22 if the probation column 623 remains null, or the date recorded in the probation column 623 is expired, but not limited thereto.

In one of the exemplary embodiments, the Docker server 22 regards the time (such as the system time of the host 1) being executed in the first time as a probation starting time of the extended image 6 and saves the same when the extended image 6 is executed on the host 1 for the first time. When the extended image 6 is executed on the host 1 but not yet registered, the Docker server 22 computes and determines whether the probation period of the extended image 6 is expired according to the pre-saved probation starting time and the probation period recorded in the probation column 623 of the extended image 6. The above description is only one of the exemplary embodiments of the present invention, but not limited thereto.

If the probation period of the extended image 6 is determined to be expired in the step S72, the Docker server 22 is not allowed to execute the extended image 6 (step S68). On the contrary, if the probation period of the extended image 6 is determined to be unexpired in the step S72, the Docker server 22 may be allowed to execute the extended image 6 according to the step S20, the step S22, and the step S24 as shown in FIG. 3.

By using the executing method of the present invention, the extended images 3, 6 can be protected from being freely deployed to unauthorized hosts. Also, the improved Docker server 22 is allowed to execute the normal images 30 as well as the extended images 3, 6. In a conclusion, this invention may increase the protection without losing the convenience of using the Docker server 22.

As the skilled person will appreciate, various changes and modifications can be made to the described embodiment. It is intended to include all such variations, modifications and equivalents which fall within the scope of the present invention, as defined in the accompanying claims.

What is claimed is:

1. A method for executing a Docker image under protection, incorporated with a Docker server being improved and the Docker image, comprising:
   a) receiving a container creating instruction by the Docker server and obtaining the Docker image corresponding to the container creating instruction;
   b) determining whether the Docker image is an extended image, wherein the extended image comprises an extended field and an original field;
   c) reading a protection column in the extended field of the Docker image when the Docker image is determined to be the extended image;
   d) determining whether the Docker image is a protected image according to content of the protection column;
   e) obtaining a supportive operating system of the Docker image when the Docker image is determined to be the protected image;
   f) replacing content of an environment column in the original field of the Docker image with the supportive operating system; and
   g) executing the Docker image according to content of the original field for correspondingly creating a Docker container after the step f) and preventing the improved Docker server and the extended image from being executed by an unauthorized host;
   wherein the step d) comprises: determining that the Docker image is the protected image if a pre-determined ID of the Docker image is recorded in the protection column, and determining that the Docker image is a non-protected image if the pre-determined ID is unrecorded in the protection column.

2. The method in claim 1, wherein the step e) comprises: reading content of an actual environment column in the extended field when the Docker image is determined to be the protected image, wherein the supportive operating system of the Docker image is recorded in the actual environment column.

3. The method in claim 1, wherein the step e) comprises: reading content of the environment column in the original field when the Docker image is determined to be the protected image, and obtaining the supportive operating system by inquiring a lookup table according to content of the environment column, wherein an unsupportive operating system is recorded in the environment column.

4. The method in claim 1, further comprising: d1) executing the step g) if the Docker image is the non-protected image.

5. The method in claim 1, wherein the step e) comprises:
   e1) reading an image ID of the Docker image when the Docker image is determined to be the protected image;
   e2) obtaining a hardware information of a host running the Docker server;
   e3) generating a first index data according to the image ID and the hardware information;
   e4) searching a file system of the host according to the first index data;
   e5) skipping the step of executing the Docker image if a registration file with a file name identical to the first index data is inexistent in the file system; and
   e6) reading the actual environment column of the Docker image if the registration file with the file name identical to the first index data is existent in the file system.

6. The method in claim 5, wherein the step e3) comprises computing a concatenated data of the image ID and the hardware information through a hash function to generate the first index data.

7. The method in claim 5, wherein the hardware information comprises an ID of a central processing unit (CPU) of the host, a serial number of a hard-drive of the host, or a media access control address (MAC Address) of a network card of the host.

8. The method in claim 5, wherein the step e6) comprises:
   e61) reading a necessary registration data recorded in the registration file when the registration file with the file name identical to the first index data is existent in the file system;
   e62) computing the necessary registration data through a hash function to generate a second index data;
   e63) searching the file system according to the second index data;

e64) skipping the step of executing the Docker image if a check file with a file name identical to the second index data is inexistent in the file system; and e65) reading the actual environment column of the Docker image when the check file with the file name identical to the second index data is existent in the file system.

9. The method in claim 5, wherein the extended field of the Docker image comprises a probation column used for recording a probation period of the Docker image, and the step e5) comprises:

e51) reading the probation column of the Docker image for obtaining the probation period when the registration file with the file name identical to the first index data is inexistent in the file system;

e52) skipping the step of executing the Docker image if the probation period is expired; and e53) reading the actual environment column if the probation period is unexpired.

10. The method in claim 1, wherein the step g) comprises:

g1) reading the environment column of the Docker image, wherein content of the environment column is replaced with the supportive operating system;

g2) determining whether an operating system of a host running the Docker server matches content of the environment column;

g3) skipping the step of executing the Docker image if the operating system of the host unmatching content of the environment column is determined; and g4) executing the Docker image according to a data column in the original field of the Docker image for creating the Docker container when content of the environment column matching the operating system of the host is determined.

* * * * *